（12）United States Patent
Kondo

(10) Patent No.: US 12,338,880 B2
(45) Date of Patent: Jun. 24, 2025

(54) VEHICLE DRIVE DEVICE

(71) Applicant: AISIN CORPORATION, Aichi (JP)

(72) Inventor: Shinji Kondo, Kariya (JP)

(73) Assignee: AISIN CORPORATION, Aichi (JP)

( * ) Notice: Subject to any disclaimer, the term of this patent is extended or adjusted under 35 U.S.C. 154(b) by 0 days.

(21) Appl. No.: 18/728,217

(22) PCT Filed: Mar. 24, 2023

(86) PCT No.: PCT/JP2023/011962
§ 371 (c)(1),
(2) Date: Jul. 11, 2024

(87) PCT Pub. No.: WO2023/190223
PCT Pub. Date: Oct. 5, 2023

(65) Prior Publication Data
US 2025/0102048 A1    Mar. 27, 2025

(30) Foreign Application Priority Data

Mar. 30, 2022 (JP) ................................ 2022-055142

(51) Int. Cl.
*F16H 57/02* (2012.01)
*F16H 37/08* (2006.01)
(Continued)

(52) U.S. Cl.
CPC ......... *F16H 37/0813* (2013.01); *F16H 48/40* (2013.01); *F16H 57/021* (2013.01);
(Continued)

(58) Field of Classification Search
CPC .............. B60K 2001/001; B60K 17/12; F16H 37/0813; F16H 57/037; F16H 2200/0021; F16H 2057/02034; F16H 2057/02052
See application file for complete search history.

(56) References Cited

U.S. PATENT DOCUMENTS 8,636,091 B2 * 1/2014 Sanji ..................... B60K 6/405
180/65.23
11,137,061 B2 * 10/2021 Ishikawa ............. F16H 57/0441
(Continued)

FOREIGN PATENT DOCUMENTS

JP        2015154519 A   *   8/2015
JP        2019-94932 A       6/2019
(Continued)

OTHER PUBLICATIONS

International Search Report for PCT/JP2023/011962 dated May 23, 2023.
Written Opinion for PCT/JP2023/011962 dated May 23, 2023.

*Primary Examiner* — Sherry L Estremsky
(74) *Attorney, Agent, or Firm* — Sughrue Mion, PLLC

(57) ABSTRACT

A vehicle drive device includes a rotary electric machine including a stator and a rotor, a power transmission mechanism drivingly connected to the rotor, a differential device including a differential ring gear, a differential case, and a differential mechanism, and a case. The case includes a partition wall disposed between the rotary electric machine and the differential device. The partition wall has an opening at a portion where a distance between a stator core and the differential device is shortest so that part of the stator core is exposed on a differential device side.

6 Claims, 3 Drawing Sheets

(51) Int. Cl.
  *F16H 48/40* (2012.01)
  *F16H 57/021* (2012.01)
  *F16H 57/037* (2012.01)
  *H02K 7/116* (2006.01)

(52) U.S. Cl.
  CPC .......... *F16H 57/037* (2013.01); *H02K 7/116* (2013.01); *F16H 2048/405* (2013.01); *F16H 2057/02034* (2013.01); *F16H 2057/02052* (2013.01)

(56) References Cited

U.S. PATENT DOCUMENTS

| | | |
|---|---|---|
| 2020/0278020 A1 | 9/2020 | Inoue et al. |
| 2022/0194230 A1* | 6/2022 | Fukunaga .............. B60K 17/12 |
| 2022/0281310 A1* | 9/2022 | Nakata ................... H02K 9/19 |
| 2024/0044399 A1* | 2/2024 | Inoue ................. F16H 37/0813 |

FOREIGN PATENT DOCUMENTS

| | | |
|---|---|---|
| JP | 2020-198675 A | 12/2020 |
| JP | 2021-131097 A | 9/2021 |

\* cited by examiner

VEHICLE DRIVE DEVICE

CROSS REFERENCE TO RELATED APPLICATIONS

This application is a National Stage of International Application No. PCT/JP2023/011962 filed Mar. 24, 2023, claiming priority based on Japanese Patent Application No. 2022-055142 filed Mar. 30, 2022, the entire contents of which are incorporated in their entirety.

TECHNICAL FIELD

This technology relates to a vehicle drive device including a rotary electric machine.

BACKGROUND ART

Hitherto, vehicle drive devices including rotary electric machines and applied to electric vehicles and hybrid vehicles have become widespread. In such a vehicle drive device, it is desirable to downsize a case to improve ease of mounting on a vehicle. To downsize the case, such a vehicle drive device has been developed that a first axis on which a rotary electric machine is mounted and a third axis on which a differential device is mounted are brought closer to each other (see Patent Document 1). In this vehicle drive device, the stator of the rotary electric machine and the differential device are disposed so as not to overlap each other in an axial direction when viewed in a radial direction, and the first axis and the third axis are brought closer to each other so that the stator and the differential device do not interfere with each other.

RELATED ART DOCUMENTS

Patent Documents

Patent Document 1: Japanese Unexamined Patent Application Publication No. 2019-94932 (JP 2019-94932 A)

SUMMARY OF THE DISCLOSURE

Problem to be Solved by Various Aspects of the Disclosure

In the configuration described in Patent Document 1, however, the rotary electric machine and the differential device are disposed widely in the axial direction. Therefore, the differential device is located on one of the right and left sides. In this state, the lengths of drive shafts may be uneven on the right and left sides. When the right and left drive shafts have different lengths, the drivability of the vehicle deteriorates. As a countermeasure, it is necessary to add an output shaft to adjust the right and left lengths. In this case, however, the costs increase.

Therefore, an object of the present disclosure is to provide a vehicle drive device that can be downsized while suppressing an increase in costs.

Means for Solving the Problem

This vehicle drive device includes: a rotary electric machine including a stator including a stator core and coil ends that protrude from the stator core on both sides in an axial direction, and a rotor provided so as to be rotatable relative to the stator; a power transmission mechanism drivingly connected to the rotor; a differential device including a differential ring gear drivingly connected to the power transmission mechanism, a differential case integrated with the differential ring gear, and a differential mechanism contained in the differential case; and a case that houses the rotary electric machine, the power transmission mechanism, and the differential device. The case includes a partition wall disposed between the rotary electric machine and the differential device. The partition wall has an opening at a portion where a distance between the stator core and the differential device is shortest so that part of the stator core is exposed on the differential device side. Thus, downsizing can be achieved while suppressing the increase in costs.

DESCRIPTION OF EMBODIMENTS

Figure 1:
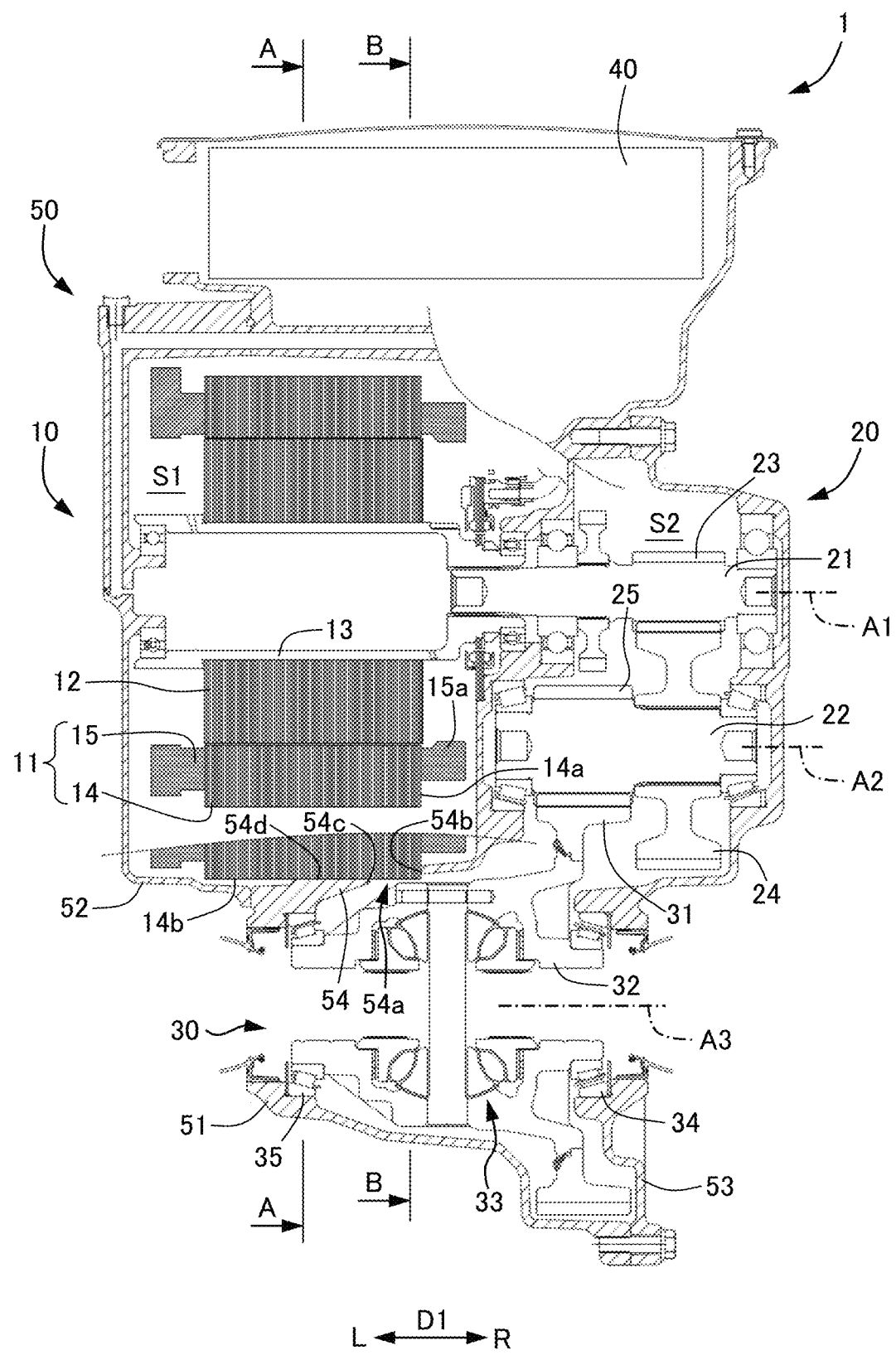
FIG. 1 is a sectional view showing a vehicle drive device according to an embodiment.
Figure 2:
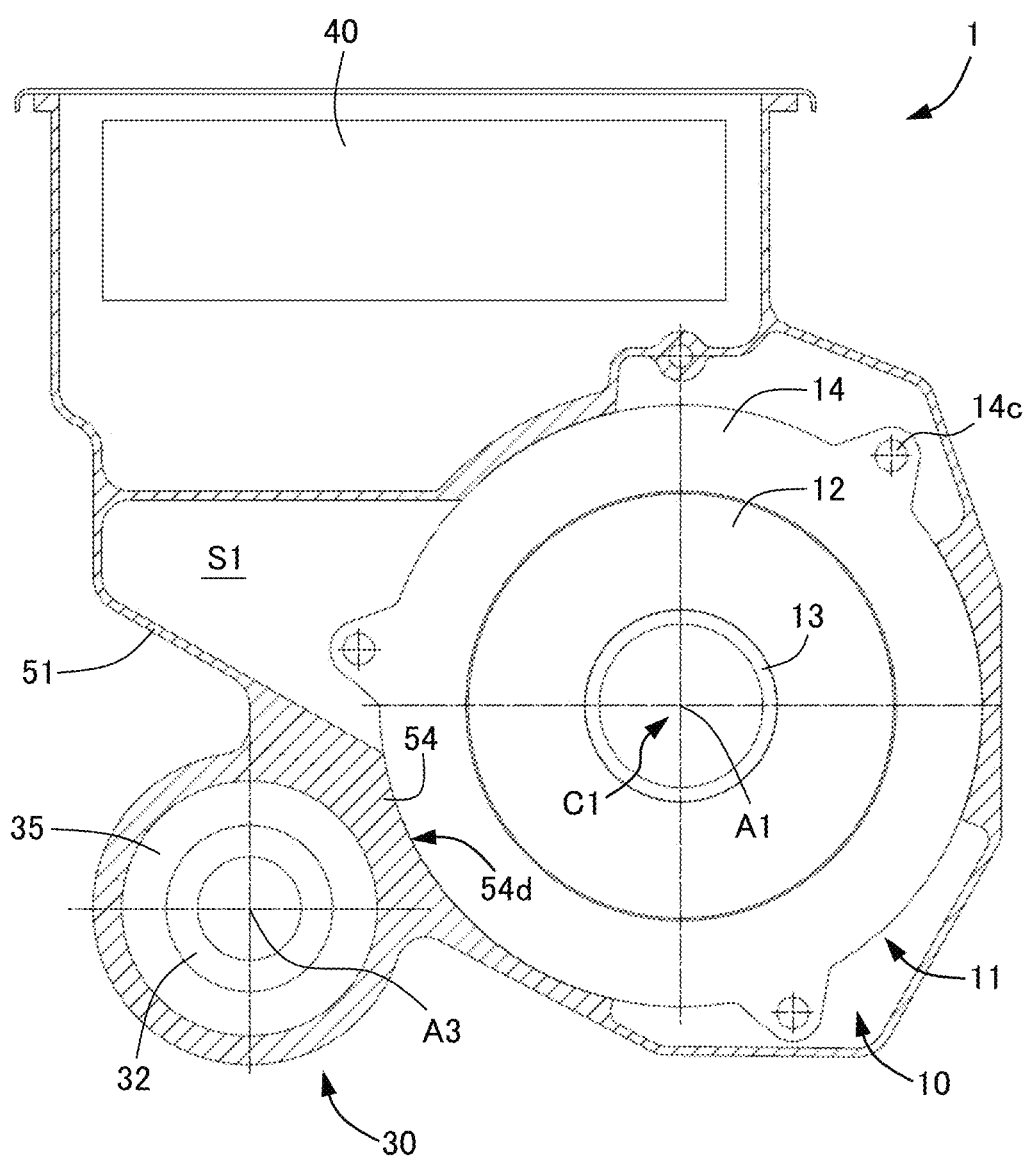
FIG. 2 is a sectional view showing a state cut along line A-A in FIG. 1.

An embodiment of the present disclosure will be described in detail below with reference to FIGS. 1 to 3. The present embodiment illustrates a case where a vehicle drive device 1 is applied to a front-wheel drive electric vehicle. The vehicle drive device 1 will be outlined with reference to FIG. 1. The vehicle drive device 1 includes a motor 10 as a rotary electric machine, a speed reduction mechanism 20 as a power transmission mechanism, a differential device 30, an inverter 40, and a case 50 that houses these components. In the present embodiment, a width direction of the vehicle including the vehicle drive device 1, that is, a direction of an axis of a rotary shaft of the motor 10 or the differential device 30, is defined as "axial direction D1", a right side in FIG. 1 is denoted as "R", and a left side in FIG. 1 is denoted as "L". A phrase "drivingly connected" refers to a state in which rotary elements are connected so that a driving force can be transmitted therebetween, and is used as a concept including a state in which the rotary elements are connected so as to rotate integrally or a state in which the rotary elements are connected via a clutch etc. so that a driving force can be transmitted therebetween.

The motor 10 includes a stator 11 fixed to the case 50, a rotor 12 rotatably provided on an inner peripheral side of the stator 11, and a rotor shaft 13 that rotatably supports the rotor 12. The stator 11 includes a stator core 14 and a coil 15 wound around the stator core 14. Both ends of the coil 15 in the axial direction D1 form coil ends 15a that protrude on both sides from the stator core 14. The stator core 14 has bolt fixing holes 14c (see FIG. 2) that are open along the axial direction D1 on the outer peripheral portion. In the present embodiment, the bolt fixing holes 14c are formed at three locations equidistant from a rotation center C1 (see FIG. 2) of the rotor 12 and at a pitch of substantially 120 degrees in a circumferential direction. The stator core 14 is fixed to a case body 51 by, for example, passing bolts through the bolt fixing holes 14c and fastening them from the left side L to the right side R. The inverter 40 is connected to the motor 10, and electric power supplied from a battery (not shown) is supplied to the motor 10 via the inverter 40 to drive the motor 10.

The speed reduction mechanism 20 includes a first rotary shaft 21 provided coaxially with a first axis A1, a second rotary shaft 22 provided coaxially with a second axis A2 that is parallel to the first axis A1 and extends at a different position from that of the first axis A1, a first gear 23 fixed on the first axis A1, and a second gear 24 and a third gear 25 fixed on the second axis A2. The first rotary shaft 21 is integrated with the rotor shaft 13. That is, the speed reduction mechanism 20 is drivingly connected to the rotor 12. The second gear 24 has a larger diameter than the first gear 23 and meshes with the first gear 23. The third gear 25 has a smaller diameter than a differential ring gear 31 described later and meshes with the differential ring gear 31. Therefore, the speed of rotation of the rotor 12 is reduced via the first rotary shaft 21 and the second rotary shaft 22 of the speed reduction mechanism 20, and the rotation is transmitted to the differential device 30. In the present embodiment, the speed reduction mechanism 20 is disposed on the right side R that is one axial side of the motor 10, and the third gear 25 is disposed on the left side L that is the other axial side of the second gear 24.

The differential device 30 is provided coaxially with a third axis A3 that is parallel to the first axis A1 and the second axis A2 and extends at a different position from those of the first axis A1 and the second axis A2. The differential device 30 includes the differential ring gear 31 drivingly connected to the third gear 25 of the speed reduction mechanism 20, a differential case 32 integrated with the differential ring gear 31, and a differential mechanism 33 contained in the differential case 32. The differential mechanism 33 absorbs a difference in rotation between right and left drive shafts attached thereto. The differential mechanism 33 is disposed at a position where the center in the axial direction D1 overlaps the motor 10 in the axial direction D1 when viewed in a radial direction. Since a known appropriate mechanism can be applied to the differential mechanism 33, detailed description thereof will be omitted.

The end of the differential case 32 on the right side R is rotatably supported on the case 50 by a bearing 34, and the end of the differential case 32 on the left side L is rotatably supported on the case 50 by a bearing 35. That is, the vehicle drive device 1 includes two bearings 34, 35 that support both ends of the differential case 32 in the axial direction D1 so that the differential case 32 is rotatable relative to the case 50. Of the two bearings 34, 35, the bearing 34 on the right side R is disposed at a position where the bearing 34 overlaps the differential ring gear 31 in the axial direction D1 when viewed in the radial direction.

The case 50 includes the case body 51 that houses the motor 10, the speed reduction mechanism 20, and the differential device 30, a first cover 52 that closes the left side L of a first space S1 that houses the motor 10, and a second cover 53 that closes the right side R of a second space S2 that houses the differential device 30. The case body 51 includes a partition wall 54 disposed between the motor 10 and the differential device 30 (see FIG. 2).

Figure 3:
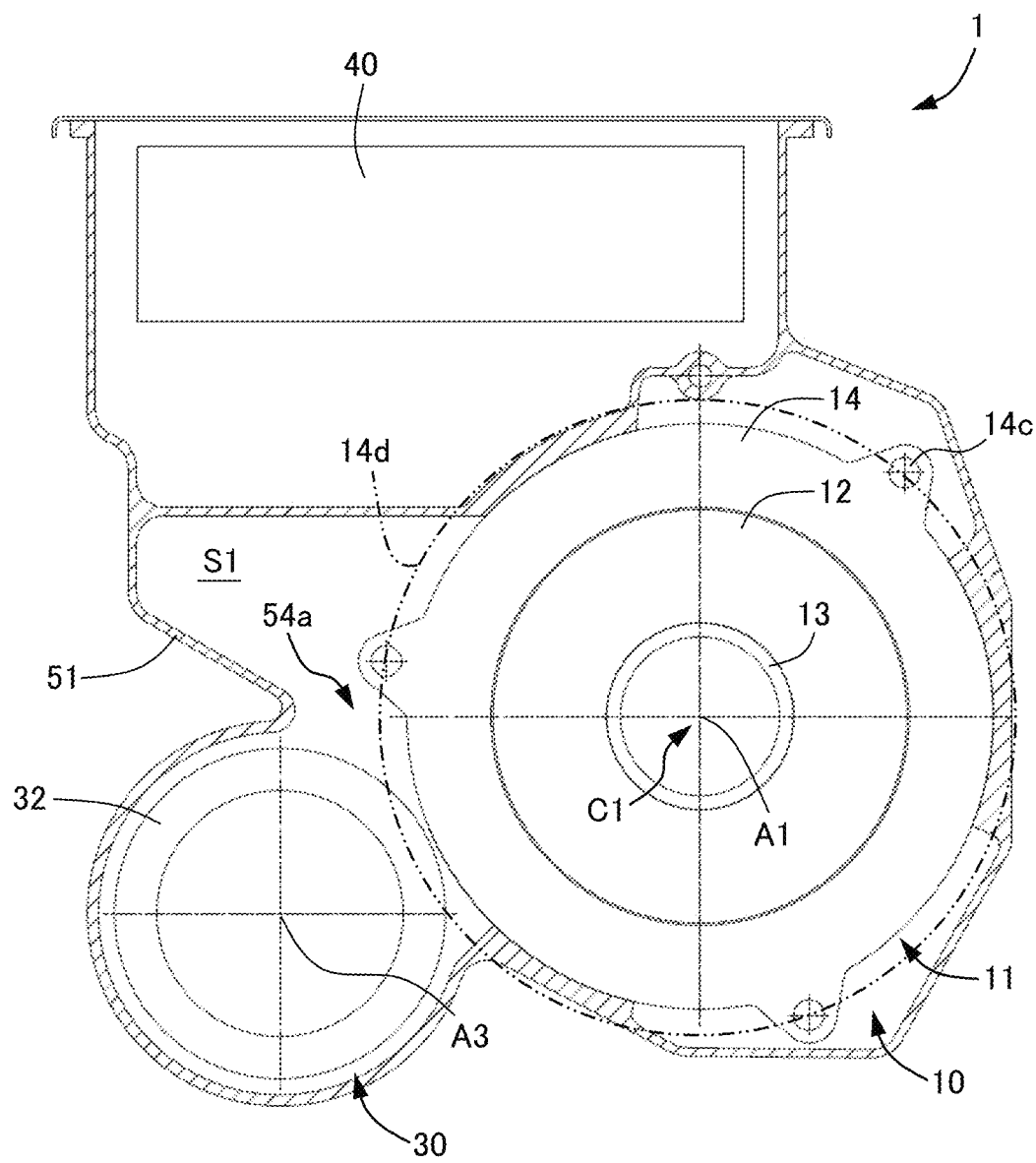
FIG. 3 is a sectional view showing a state cut along line B-B in FIG. 1.

The partition wall 54 has an opening 54a at a portion where the distance between the stator core 14 and the differential device 30 is shortest so that part of the stator core 14 is exposed on the differential device side (see FIG. 3). The opening 54a has, for example, a circular, elliptical, rectangular, or notched shape to pass through the partition wall 54. The opening 54a is formed at the same time as the case body 51 is cast, but the present disclosure is not limited to this. The opening 54a may be formed by actually cutting out the case body 51 after it is cast.

The portion where the distance between the stator core 14 and the differential device 30 is shortest is, for example, the shortest distance connecting a portion on the differential device 30 side in the radial direction on a stator core end face 14a (second end face) of the stator core 14 on the differential device 30 side in the axial direction D1 and the differential device 30 facing that portion. Alternatively, it may be the shortest distance connecting the end of an outer peripheral surface 14b of the stator core 14 on the differential device 30 side in the axial direction D1 and the differential device 30 facing that end. Therefore, the stator core 14 and the differential device 30 directly face each other via the opening 54a, and the stator core 14 and the differential device 30 can be brought into close proximity in the radial direction without being shifted in the axial direction D1. Thus, the vehicle drive device 1 can be downsized.

In the present embodiment, as shown in FIG. 3, at the portion where the distance between the stator core 14 and the differential device 30 is shortest, the differential device 30 is disposed to overlap an imaginary circle 14d passing through the centers of the bolt fixing holes 14c about the rotation center Cl (first axis A1) of the rotor 12 when the stator core 14 is viewed in the axial direction D1. Therefore, the stator core 14 and the differential device 30 can be brought into close proximity in the radial direction. Thus, the vehicle drive device 1 can be downsized.

The opening 54a includes an opening end face 54b (first end face) oriented to the left side L at the end on the right side R. The stator core end face 14a of the stator core 14 on the right side R is disposed in close contact with the opening end face 54b in the axial direction D1. The stator core 14 is fastened to the case body 51 with bolts to the right side R. However, the stator core end face 14a and the opening end face 54b are not pressed strongly against each other, but are in close contact with each other. Thus, foreign matter contained in lubricating oil scooped up by the differential case 32 can be prevented from directly coming into contact with the coil ends 15a having low strength through a space between the stator core 14 and the opening end face 54b.

As the size of the opening 54a increases, it is easier to avoid interference with the differential case 32. When the size is excessively large, however, the support force for supporting the stator core 14 when it is deformed as one of the original functions of the partition wall 54 decreases. Therefore, the size of the opening 54a is, for example, at least about 3 mm in the axial direction D1, and at most from the stator core end face 14a to the center of the stator core 14 in the axial direction D1. That is, it is preferable that an end 54c of the opening 54a on the left side L be positioned on the right side R of the center of the stator core 14 in the axial direction D1. In the present embodiment, the opening 54a is provided with approximately a quarter of the length of the stator core 14 from the stator core end face 14a in the axial direction D1. The size and position of the opening 54a are not limited to them, and can be set as appropriate depending on the distance between the stator core 14 and the differential case 32 and the position in the axial direction D1.

A surface 54d on the motor 10 side for the partition wall 54 on the left side L of the opening 54a faces the outer peripheral surface 14b of the stator core 14. A slight clearance is secured between the surface 54d and the outer peripheral surface 14b. Therefore, the stator core 14 is supported by the partition wall 54 even when the stator core 14 vibrates due to the drive of the vehicle drive device 1. Since the clearance is secured between the surface 54d and the outer peripheral surface 14b, foreign matter contained in the lubricating oil scooped up by the differential case 32 will not directly come into contact with the coil ends 15a. Thus, no problem will occur.

As described above, the vehicle drive device 1 of the present embodiment has the opening 54a at the portion where the distance between the stator core 14 and the differential device 30 is shortest so that part of the stator core 14 is exposed on the differential device 30 side. Therefore, the stator core 14 and the differential device 30 can be brought into close proximity in the radial direction without being shifted in the axial direction D1. Without the shift in the axial direction D1, the differential device 30 can be disposed at the center in the lateral direction. Thus, the drivability of the vehicle can be secured without causing an increase in costs due to addition of an output shaft. Accordingly, the vehicle drive device 1 can be downsized while suppressing the increase in costs.

In the vehicle drive device 1 of the present embodiment, the stator core end face 14a of the stator core 14 is disposed in close contact with the opening end face 54b in the axial direction D1. Thus, foreign matter contained in the lubricating oil scooped up by the differential case 32 can be prevented from directly coming into contact with the coil ends 15a.

In the vehicle drive device 1 of the present embodiment, the end 54c of the opening 54a on the left side L is positioned on the right side R of the center of the stator core 14 in the axial direction D1. Thus, when the stator is deformed due to vibration etc., the partition wall 54 can support the stator so as not to cause deformation.

In the vehicle drive device 1 of the present embodiment, the differential mechanism 33 of the differential device 30 is disposed at the position where the center in the axial direction D1 overlaps the motor 10 in the axial direction D1 when viewed in the radial direction. Therefore, the differential device 30 can easily be disposed at the center in the axial direction D1.

In the vehicle drive device 1 of the present embodiment, the third gear 25 of the speed reduction mechanism 20 is disposed on the left side L of the second gear 24, that is, on the differential device 30 side, and the third gear 25 meshes with the differential ring gear 31. Therefore, the differential device 30 can easily be disposed at the center in the axial direction D1 without an increase in the length of the speed reduction mechanism 20 in the axial direction D1.

In the vehicle drive device 1 of the present embodiment, the bearing 34 on the right side R of the differential case 32 is disposed at the position where the bearing 34 overlaps the differential ring gear 31 in the axial direction D1 when viewed in the radial direction. Therefore, the vehicle drive device 1 can be downsized.

Although the description has been given of the case where the vehicle drive device 1 of the present embodiment is applied to a front-wheel drive electric vehicle, the present disclosure is not limited to this. For example, the vehicle drive device 1 may be applied to a rear-wheel drive electric vehicle or to a hybrid vehicle.

SUMMARY OF EMBODIMENT

The vehicle drive device (1) of the present embodiment includes:
- a rotary electric machine (10) including a stator (11) including a stator core (14) and coil ends (15a) that protrude from the stator core (14) on both sides in an axial direction (D1), and a rotor (12) provided so as to be rotatable relative to the stator (11);
- a power transmission mechanism (20) drivingly connected to the rotor (12);
- a differential device (30) including a differential ring gear (31) drivingly connected to the power transmission mechanism (20), a differential case (32) integrated with the differential ring gear (31), and a differential mechanism (33) contained in the differential case (32); and a case (50) that houses the rotary electric machine (10), the power transmission mechanism (20), and the differential device (30), in which
- the case (50) includes a partition wall (54) disposed between the rotary electric machine (10) and the differential device (30), and
- the partition wall (54) has an opening (54a) at a portion where a distance between the stator core (14) and the differential device (30) is shortest so that part of the stator core (14) is exposed on the differential device (30) side.

With this configuration, the stator core (14) and the differential device (30) can be brought into close proximity in the radial direction without being shifted in the axial direction (D1). Without the shift in the axial direction (D1), the differential device (30) can be disposed at the center in the lateral direction. Thus, the drivability of the vehicle can be secured without causing an increase in costs due to addition of an output shaft. Accordingly, the vehicle drive device (1) can be downsized while suppressing the increase in costs.

In the vehicle drive device (1) of the present embodiment, it is preferable that
- the stator core (14) have bolt fixing holes (14c) that are open along the axial direction (D1) on an outer peripheral portion, and
- at the portion where the distance between the stator core (14) and the differential device (30) is shortest, the differential device (30) be disposed to overlap an imaginary circle (14d) passing through centers of the bolt fixing holes (14c) about a rotation center of the rotor (12) when the stator core (14) is viewed in the axial direction (D1).

With this configuration, the stator core (14) and the differential device (30) can be brought into close proximity in the radial direction. Thus, the vehicle drive device (1) can further be downsized.

In the vehicle drive device (1) of the present embodiment, it is preferable that
- the power transmission mechanism (20) be disposed on one axial side (R) of the rotary electric machine (10),
- the opening (54a) have a first end face (54b) oriented to the other axial side (L) at an end on the one axial side (R), and
- a second end face (14a) of the stator core (14) on the one axial side (R) be disposed in close contact with the first end face (54b) in the axial direction (D1).

With this configuration, foreign matter contained in lubricating oil scooped up by the differential case (32) can be prevented from directly coming into contact with the coil ends (15a).

In the vehicle drive device (1) of the present embodiment, it is preferable that
- an end (54c) of the opening (54a) on the other axial side (L) be positioned on the one axial side (R) of a center of the stator core (14) in the axial direction (D1).

With this configuration, when the stator (11) is deformed due to vibration etc., the partition wall (54) can support the stator so as not to cause deformation.

In the vehicle drive device (1) of the present embodiment, it is preferable that the power transmission mechanism (20) be a speed reduction mechanism (20) including a first rotary shaft (21) disposed on one axial side (R) of the rotary electric machine (10) and drivingly connected to the rotor (12), a first gear (23) fixed to the first rotary shaft (21), a second rotary shaft (22) disposed parallel to the first rotary shaft (21), a second gear (24) fixed to the second rotary shaft (22), having a larger diameter than the first gear (23), and meshing with the first gear (23), and a third gear (25) fixed to the second rotary shaft (22), disposed on the other axial side (L) of the second gear (24), having a smaller diameter than the differential ring gear (31), and meshing with the differential ring gear (31), and the differential mechanism (33) be disposed at a position where a center in the axial direction (D1) overlaps the rotary electric machine (10) in the axial direction (D1) when viewed in a radial direction.

With this configuration, the differential device (30) can easily be disposed at the center in the axial direction (D1).

It is preferable that the vehicle drive device (1) of the present embodiment include two bearings (34, 35) that support both ends of the differential case (32) in the axial direction (D1) so that the differential case (32) is rotatable relative to the case (50), and of the two bearings (34, 35), the bearing (34) on the one axial side (R) be disposed at a position where the bearing (34) overlaps the differential ring gear (31) in the axial direction (D1) when viewed in the radial direction.

With this configuration, the vehicle drive device (1) can further be downsized.

INDUSTRIAL APPLICABILITY

The vehicle drive device according to the present disclosure is industrially applicable as a vehicle drive device including a rotary electric machine mounted on a vehicle such as an automobile.

DESCRIPTION OF THE REFERENCE NUMERALS

1 . . . vehicle drive device, 10 . . . motor (rotary electric machine), 11 . . . stator, 12 . . . rotor, 14 . . . stator core, 14a . . . stator core end face (second end face), 14c . . . bolt fixing hole, 14d . . . imaginary circle, 15a . . . coil end, 20 . . . speed reduction mechanism (power transmission mechanism), 21 . . . first rotary shaft, 22 . . . second rotary shaft, 23 . . . first gear, 24 . . . second gear, 25 . . . third gear, 30 . . . differential device, 31 . . . differential ring gear, 32 . . . differential case, 33 . . . differential mechanism, 34, 35 . . . bearing, 50 . . . case, 54 . . . partition wall, 54a . . . opening, 54b . . . opening end face (first end face), 54c . . . end, D1 . . . axial direction, L . . . left side (other axial side), R . . . right side (one axial side)

The invention claimed is:

1. A vehicle drive device comprising:
a rotary electric machine including a stator including a stator core and coil ends that protrude from the stator core on both sides in an axial direction, and a rotor provided so as to be rotatable relative to the stator;
a power transmission mechanism drivingly connected to the rotor;
a differential device including a differential ring gear drivingly connected to the power transmission mechanism, a differential case integrated with the differential ring gear, and a differential mechanism contained in the differential case; and
a case that houses the rotary electric machine, the power transmission mechanism, and the differential device, wherein
the case includes a partition wall disposed between the rotary electric machine and the differential device, and
the partition wall has an opening at a portion where a distance between the stator core and the differential device is shortest so that part of the stator core is exposed on the differential device side.

2. The vehicle drive device according to claim 1, wherein:
the stator core has bolt fixing holes that are open along the axial direction on an outer peripheral portion; and
at the portion where the distance between the stator core and the differential device is shortest, the differential device is disposed to overlap an imaginary circle passing through centers of the bolt fixing holes about a rotation center of the rotor when the stator core is viewed in the axial direction.

3. The vehicle drive device according to claim 1, wherein:
the power transmission mechanism is disposed on one axial side of the rotary electric machine;
the opening has a first end face oriented to the other axial side at an end on the one axial side; and
a second end face of the stator core on the one axial side is disposed in close contact with the first end face in the axial direction.

4. The vehicle drive device according to claim 3, wherein an end of the opening on the other axial side is positioned on the one axial side of a center of the stator core in the axial direction.

5. The vehicle drive device according to claim 1, wherein:
the power transmission mechanism is a speed reduction mechanism including a first rotary shaft disposed on one axial side of the rotary electric machine and drivingly connected to the rotor, a first gear fixed to the first rotary shaft, a second rotary shaft disposed parallel to the first rotary shaft, a second gear fixed to the second rotary shaft, having a larger diameter than the first gear, and meshing with the first gear, and a third gear fixed to the second rotary shaft, disposed on the other axial side of the second gear, having a smaller diameter than the differential ring gear, and meshing with the differential ring gear; and
the differential mechanism is disposed at a position where a center in the axial direction overlaps the rotary electric machine in the axial direction when viewed in a radial direction.

6. The vehicle drive device according to claim 5, further comprising two bearings that support both ends of the differential case in the axial direction so that the differential case is rotatable relative to the case, wherein of the two bearings, the bearing on the one axial side is disposed at a position where the bearing overlaps the differential ring gear in the axial direction when viewed in the radial direction.

* * * * *